United States Patent [19]

Sato

[11] Patent Number: 5,016,409
[45] Date of Patent: May 21, 1991

[54] METHOD FOR RESTRAINING RESPONSE OF A STRUCTURE TO OUTSIDE DISTURBANCES AND APPARATUS THEREFOR

[75] Inventor: Takanori Sato, Tokyo, Japan

[73] Assignee: Shimizu Construction Co., Ltd., Tokyo, Japan

[21] Appl. No.: 445,912

[22] Filed: Dec. 4, 1989

Related U.S. Application Data

[63] Continuation of Ser. No. 186,613, Apr. 27, 1988, abandoned.

[30] Foreign Application Priority Data

Apr. 28, 1987 [JP] Japan .................. 62-64951[U]
Apr. 28, 1987 [JP] Japan .................. 62-105571

[51] Int. Cl.$^5$ ............................................. E04H 9/02
[52] U.S. Cl. ............................................ 52/167 DF
[58] Field of Search ............ 52/167; 248/562, 636, 248/638

[56] References Cited

U.S. PATENT DOCUMENTS

| | | | |
|---|---|---|---|
| 3,145,012 | 8/1964 | Kfoury | 248/638 |
| 3,392,953 | 7/1968 | Ciringione et al. | 248/562 |
| 4,669,710 | 6/1987 | Howat | 248/562 |
| 4,700,932 | 10/1987 | Katsuno | 52/167 |
| 4,783,937 | 11/1988 | Sato . | |

FOREIGN PATENT DOCUMENTS

| | | | |
|---|---|---|---|
| 130909 | 6/1949 | Australia | 248/562 |
| 402388 | 5/1967 | Australia | 248/562 |
| 719081 | 6/1942 | Fed. Rep. of Germany | 248/562 |
| 1067263 | 10/1959 | Fed. Rep. of Germany | 248/562 |
| 58-176321 | 10/1983 | Japan | 52/167 |
| 74687 | 2/1949 | Norway | 52/167 |
| 636326 | 12/1978 | U.S.S.R. | 52/167 |
| 723038 | 4/1980 | U.S.S.R. | 52/167 |
| 1094903 | 5/1984 | U.S.S.R. | 52/167 |
| 1191676 | 11/1985 | U.S.S.R. | 248/636 |
| 1260450 | 9/1986 | U.S.S.R. | 52/167 |
| 433531 | 8/1935 | United Kingdom . | |
| 433532 | 8/1935 | United Kingdom . | |
| 784387 | 10/1957 | United Kingdom . | |
| 999421 | 7/1965 | United Kingdom . | |
| 1278330 | 6/1972 | United Kingdom . | |
| 1322807 | 7/1973 | United Kingdom . | |
| 1509223 | 5/1978 | United Kingdom . | |
| 2162139A | 1/1986 | United Kingdom . | |
| 2194017A | 2/1988 | United Kingdom . | |

Primary Examiner—Michael Safavi
Attorney, Agent, or Firm—Hoffmann & Baron

[57] ABSTRACT

The present invention concerns apparatus for restraining vibration of a structure having at least one natural mode of vibration. The apparatus comprises an enclosure, a main weight, a resilient member, a viscous liquid, and an adjustment device. The enclosure defines an inner space therein and the main weight has a mass and is enclosed in the enclosure. The resilient member connects the weight to the enclosure and exerts on the weight, a restoring force proportional to the relative displacement of the weight with respect to the enclosure. The viscous liquid is retained in the inner space and has a viscosity which provides to the weight, a damping force which is proportional to a relative velocity of the weight with respect to the enclosure. The resilience of the resilient member and the mass of the main weight provide the apparatus with at least one natural frequency of vibration. The adjustment device provides the capability of adjusting resilience of the resilient member and/or the mass of the weight, in order to adjust the natural frequency of the apparatus. In order to restrain the vibration of the structure, the apparatus has at least one natural frequency of vibration which corresponds to at least one natural mode of vibration in the structure.

4 Claims, 8 Drawing Sheets

METHOD FOR RESTRAINING RESPONSE OF A STRUCTURE TO OUTSIDE DISTURBANCES AND APPARATUS THEREFOR

This is a continuation of copending application(s) Ser. No. 07/186,613 filed on Apr. 27, 1988 now abandoned.

BACKGROUND OF THE INVENTION

The present invention relates to an apparatus and a method for restraining vibration of structures.

Formerly, in order to make structures resistant against such vibrational loads as earthquakes, winds and traffics, the structures have been constructed earthquake resistant by virtue of seismic design which is a design philosophy to construct the structure enough strong to withstand the loads. But recently, a notion so called a seismic isolation has been developed and brought into practical use for protecting the structure from seismic loads. The seismic isolation is to support the structure by a relatively soft and flexible support and absorb the seismic load to be induced to the structure by a large deformability of the support. A problem as to the seismic isolation is, though the isolation is effective for cutting off vibrational loads which is to be induced to the structure through the support, that it sometimes make the situation worse when a vibrational load is induced directly to the building without passing through the supports. Such situations occur when the structure vibrates because of winds or, for example, when a bridge vibrates because of the traffics passing thereon. In such cases, vibration is apt to become large if a conventional isolation technique is applied.

In order to give solution to this inconvenience, vibration restraining structures have also been developed. FIG. 9 shows an example of such conventional vibration restraining structures.

In FIG. 9, a vibration restraining structure denoted by 100 comprises a weight 101, a supporting bed 102 having an oil film 103 thereon for supporting the weight 101 by the film 103 and supported by a floor 104, a gas damper 105 containing nitrogen gas therein, a hydraulic actuator 106 for giving a horizontal force to the weight 101, a servo-valve 107 for controlling oil flow to the actuator 106, and an oil supply unit 108 for supplying oil to the actuator 106 through the servo-valve 107. The structure has a same sectional feature as regards two vertical planes perpendicular to each other.

Operation of the vibration restraining structure is as follows.

Because the weight 101 is supported by the supporting bed 102 and the oil film 103 thereon, friction force acting on the weight 101 is negligibly small. So, without a thrusting force of the actuator 106 and the gas damper 105, the weight 101 stays still even when the structure, thus the bed 102 vibrates horizontally. On the contrary, the actuator 106 receives a reaction force from the weight 101 when it exerts a thrusting force thereto. By giving thrust force in a proper direction, the reaction force restrains the vibration of the structure. This is how the vibration restraining structure 100 acts to restrain the vibration of the structure. The gas damper 105 increases the effect of the vibration restraining structure 100 by consuming vibrational energy.

A problem as to the above-mentioned vibration restraining structure is that a numbers of supplementary equipments, such as control units and sensors, are necessary for the restraining structure thus increasing inevitably the total cost of the restraining structure.

Another problem is that the number of the restraining structures installed in a structure is restricted to a very few numbers from an economical point of view. Therefore, the restraining force exerted to the structure by the restraining structure is concentrated on the few points where the restraining structure is installed and in some cases reinforcement of the structure is need.

One other conventional device for restraining vibration of a structure is invented by the present inventor and disclosed in a Japanese Patent Application No. 62-13367, as shown in FIG. 14. The device 110 comprises an enclosure 111, a weight 112, a spring 113 supporting the weight 112 from the enclosure 111, and viscous liquid 114 filling a space in the enclosure 111. The device is attached to a structure 115, vibration of which is to be restrained. When the structure 115 vibrates, the vibration stimulates the device 110 and the weight 112 starts oscillating at its natural frequency under effects of the viscous liquid 114 and the spring 113. If the natural frequency of the device 110 is so tuned as to coincide with a natural frequency of the structure, the device acts as a so called dynamic damper and reduces vibration of the structure. Natural frequency of the device 110 can be varied and adjusted to coincide with that of the structure by properly selecting properties of the weight 112, the spring 113 and the viscous liquid 114.

But a problem residing in the device is that once the natural frequency of the device is selected, it is not easy to alter the natural frequency. During a long service period, the natural frequency of the building and the natural frequency of the device may vary because of a deterioration of physical properties of the elements composing the structure or the device 110. In such cases, the device is not convenient in readjusting the natural frequency.

Another problem as to the device is that the device is effective for reducing a vibration in only one direction. Therefore, in order to reduce a three-dimensional vibration of a structure, it is obliged to install at least three such devices, each directed in a direction perpendicular to the others.

SUMMARY OF THE INVENTION

In order to find a solution to such inconveniences, an apparatus and method for restraining vibration according to the present invention is directed to provide a method for restraining vibration of a structure and an apparatus therefor which has a relatively simple construction, costs less, and of which the natural frequency is adjustable after installation in a structure. In the present invention, the vibration restraining apparatus is a so called static structure which does not need supplementary equipments. Further, adjustment of the natural frequency is effectuated by altering either the rigidity of the spring or the mass of the weight.

Another object of the invention is to provide an apparatus which is effective in many directions simultaneously. In the present invention, vibrations in vertical and horizontal directions are restrained by effects of a massive weight vibrating in tune vertically, and vibrations in x-axis direction and y-axis direction are restrained by virtue of sloshing of a liquid retained in the mass which has a form of an enclosure containing the liquid.

In one aspect of the present invention, the apparatus according to the present invention comprises (a) an enclosure defining an inner space therein, (b) a main weight enclosed in the enclosure, (c) a resilient member connecting the weight to the enclosure and giving the weight a restoring force originated in a resilience thereof according to a relative displacement of the weight with respect to the enclosure, and (d) viscous liquid retained in the inner space and giving the weight a damping force originated in a viscosity thereof according to a relative velocity of the weight with respect to the enclosure, so that the apparatus has at least one natural frequency and at least one natural mode corresponding thereto wherein the weight displaces with respect to the enclosure in accordance with a deformation of the resilient member.

In another aspect of the present invention, there is provided a method for restraining vibration of a structure, the structure having a natural frequency, the method comprising the steps of (a) attaching an enclosure to the structure, (b) attaching a resilient member to the enclosure so that the member is retained inside the enclosure, (c) attaching a weight to the resilient member so as to give the weight a restoring force originated in a resilience of the resilient member according to a relative displacement of the weight with respect to the enclosure, and (d) filling the space inside the enclosure with viscous liquid in order to give the weight a damping force originated in a viscosity of the viscous liquid according to a relative velocity of the weight with respect to the enclosure, wherein dimensions of the enclosure, resilience of the resilient member, mass and dimensions of the weight, and viscosity of the viscous liquid are selected so that an oscillatory system composed of the weight and the resilient member has a natural frequency which generally coincides with the natural frequency of the structure.

PREFERRED EMBODIMENTS OF THE INVENTION

Preferred embodiments of the present invention will be explained in detail hereinafter.

(1) First preferred embodiment

Figure 6:
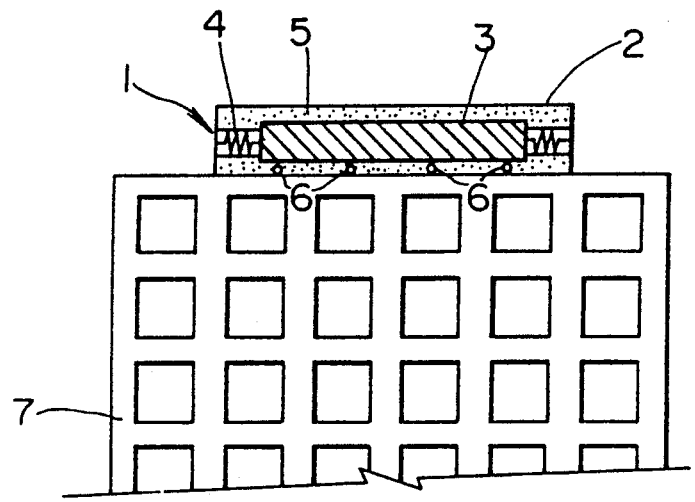
FIG. 6 is a schematical, elevation view of a building including a vibration restraining apparatus.
Figure 7:
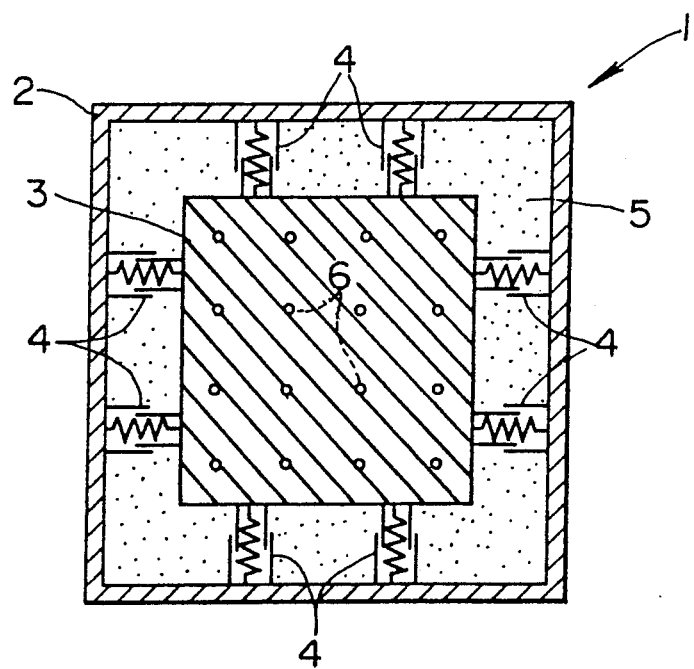
FIG. 7 is a sectional view of the apparatus shown in FIG. 6.

FIGS. 6 and 7 show a preferred embodiment of the apparatus according to the present invention installed at a top of a building 7. The apparatus 1, comprises a casing 2 attached to the building 7, a weight 3 made of a massive concrete and weighing about a few percent of the building 7, bearing means 6 supporting the weight 3 and permitting a free horizontal movement of the weight 3 with respect to the casing 2, resilient means 4 connecting the weight 3 to the casing 2 and giving horizontal restoring forces to the mass 3 according to a relative displacement of the mass 3 against the casing 2, and viscous liquid material 5 filling a space in the casing 2. The casing 2 and the weight 3 have a square horizontal cross-section. The weight 3 is normally located at a center of the casing 2. Gaps between the weight 3 and the casing 2 is enough large so that the weight 3 may not collide with the casing 2 during vibration of the building. The resilient means 4 also have enough stroke to permit a relative displacement of the weight against the casing.

Properties of the weight 3, the resilient means 4, and the viscous liquid material 5 are so determined that a natural frequency of the apparatus 1 determined as follows coincides with a natural frequency of the building 7.

In order to express the vibrational characteristics of the apparatus 1, the apparatus is modeled by an oscillatory system composed of a mass M, a spring supporting the mass and having a rigidity K, and a damper connected to the mass parallel to the spring and having a damping coefficient C. The model is called a Voigt Model. Natural frequency Fn of such a Voigt Model is approximately given by the following equation.

$$Fn = \sqrt{K/M} / 2\pi$$

pi: the ratio of the circumference of a circle to its diameter

Figure 13:
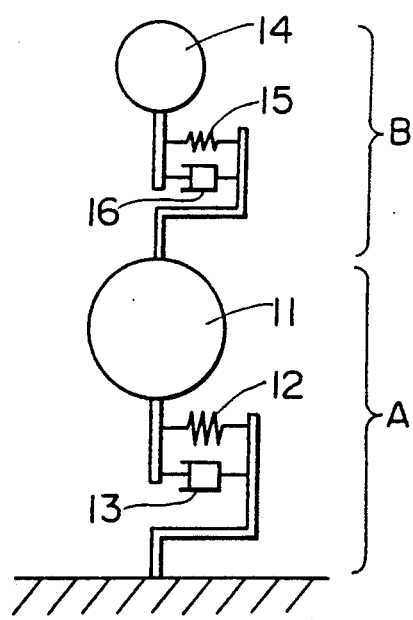
FIG. 13 is a schematical, elevation view of an oscillating system.
Figure 14:
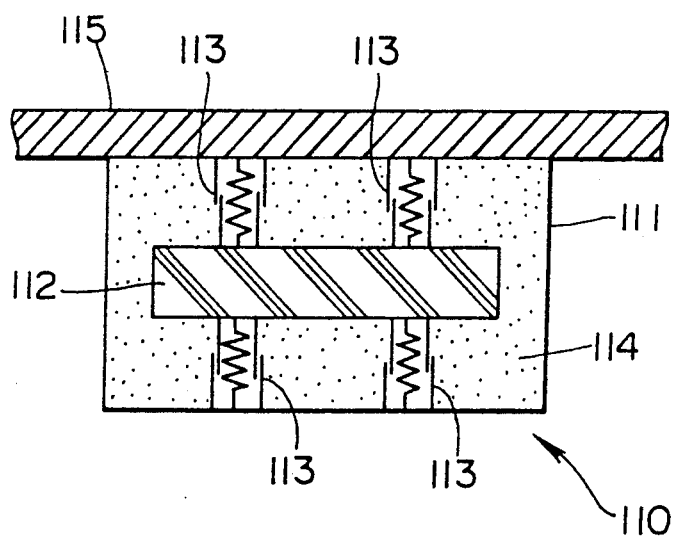
FIG. 14 is an elevation view of a prior art vibration restraining apparatus.

The building 7 is also modeled by a Voigt Model, properties of which being different from those of the apparatus 1, naturally. So, a building equipped with a vibration restraining apparatus is modeled by a couple of Voigt Models, one mounted on top of the other as shown in FIG. 13.

Operation of the embodiment will now be explained referring to FIG. 13 which is a so called two-degree-of-freedom oscillating system. A mass-spring-dashpot system A represents schematically vibrational characteristics of the building. A mass 11, a spring 12 and a dashpot 13 represent effective mass, effective stiffness and effective damping of the mode, respectively, which are determined by the structural property of the building. A mass-spring-dashpot system B represent a restraining structure. A mass 14, a spring 15, and a dashpot 16 represent the mass of the weight, the rigidity of the spring and the damping coefficient respectively of the vibration restraining structure. Property of dashpot 16 is determined mainly by viscosity of the liquid and geometry of the weight 3 and the casing 2.

Since the effective mass of the apparatus is less than a few percent of the effective mass of the building. coupling effect in the natural frequency of the building and the apparatus is negligible. Therefore, when the natural frequency of the building coincides with that of the apparatus, the coupled two-degree-of-freedom system vibrates with that same frequency.

Natural frequency of the building Fb is determined as follows.

$$Fbn = \sqrt{Kn/Mn}\,/2\,\text{pi}$$

wherein
Kn : modal stiffness of the building
Mn : modal mass of the building

Thus, since the above parameters are ascertainable, it becomes possible to set a natural frequency of the apparatus equal to the natural frequency of the building by making use of the above-mentioned equations.

As the vibration of the weight resonates with the vibration of the building when the building vibrates due to earthquakes etc., the vibrational amplitude of the building is reduced by virtue of the vibration restraining structure. Thus the apparatus acts as a so called dynamic damper.

In the above explanation, vibrational characteristics of the building are represented using an analysis considering only the first mode of natural vibration of the building, and the effects of the vibration restraining structure on the building were explained on that basis. Notably, this analysis was given, for simplicity of explanation. However, application of the vibration restraining structure is not restricted to restraining only the first normal mode of a building but it is also applicable to restrain any other natural modes of vibration of the building, as well. In such cases, the vibration restraining structure should be installed in the building where the building undergoes the largest displacement for a given target mode. Consequently, the vibration restraining structure is installed at one out of a plurality of intermediate floors.

In the above explanation, the weight is movable in horizontal directions. But, the direction of movement is not necessarily restricted to the horizontal directions but the weight may be movable in a vertical direction when the weight is suspended from the casing by the springs. Each natural frequency of the building is associated with one vibrational mode. Therefore, properties of the elements composing the vibration restraining structure are determined so as to equate the natural frequency of the apparatus to the natural frequency of the building. Because the vibration restraining apparatus according to the present invention is compact, the apparatus can be installed in any building.

(2) Second Embodiment of the Invention

Figure 1:
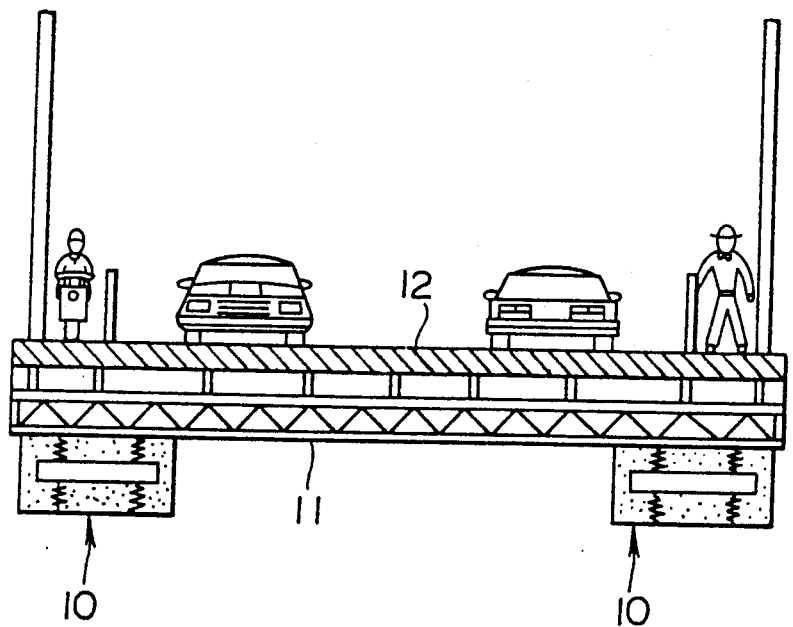
FIG. 1 is a schematical elevation view of a bridge including a vibration restraining apparatus.

FIG. 1 shows another embodiment of the present invention applied to a bridge. In the figure, a pair of vibration restraining apparatuses 10 is attached to a lower surface 11 of a bridge 12. A plurality of the apparatus 10 are attached to the bridge 12 along its longitudinal direction.

Figure 2:
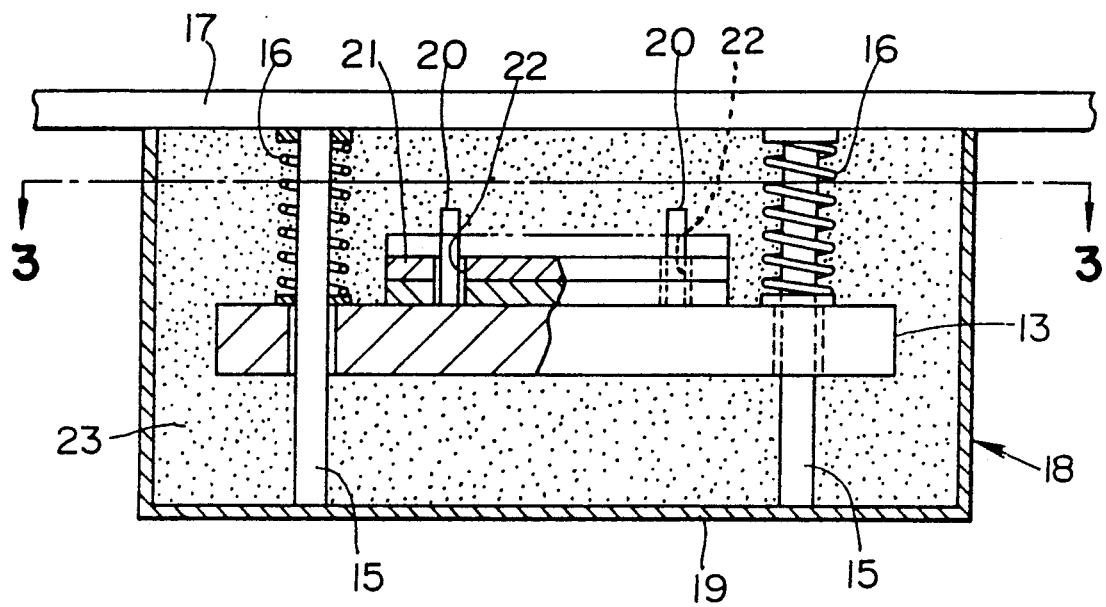
FIG. 2 is a sectional, elevation view of a vibration restraining apparatus according to the invention.
Figure 3:
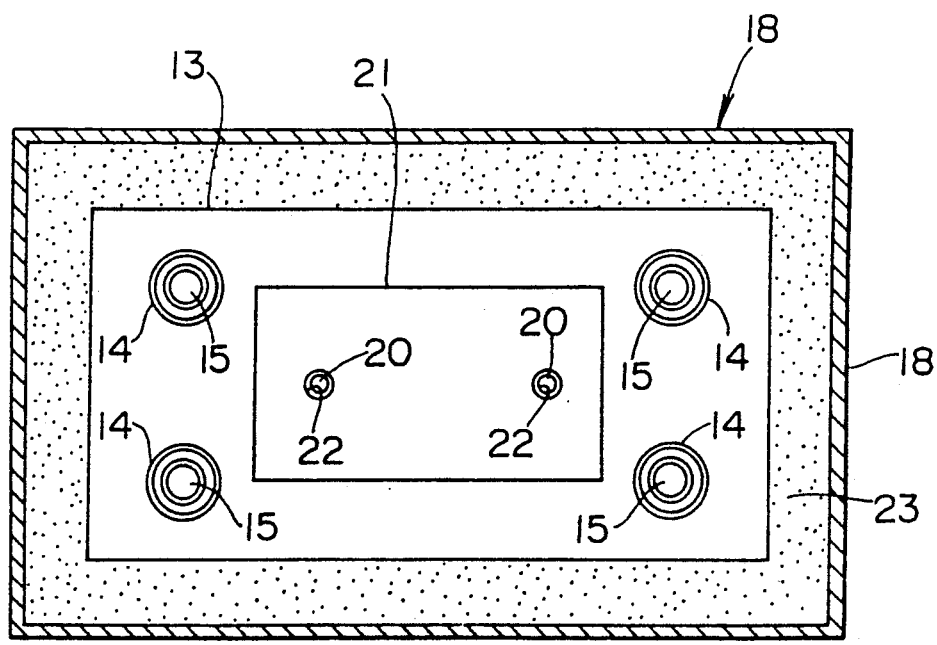
FIG. 3 is a sectional view taken along line 3—3 in FIG. 2.

FIG. 2 shows a vertical cross-section of the apparatus 10. The apparatus 10 comprises a casing 18 and, a weight 13 positioned generally at a center of the casing 18 and having a hole 14 at each of its four corners thereof. Four columns 15 connect an upper plate 17 of the casing 18 and a bottom plate 19 of the casing 18, and thread through the respective four holes of the weight 13. A coil spring 16 is provided to connect the weight 13 and the upper plate 17. In other words, the weight 13 is suspended from the upper plate 17 of the casing 18 generally at a central position thereof. The weight 13 has two poles 20 standing upright from an upper surface thereof. A few additional weights 21 having a pair of positioning holes 22 are loaded on the weight 13. To secure weights 21 to weight 13, the poles 20 thread into respective positioning holes 22. Total weight of the mass loaded on the spring 16 is easily adjustable by changing the number of additional weights 21 loaded on the weight 13. The space defined within casing 18 as shown by the arrow is filled with a viscous fluid material 23.

By virtue of the above-mentioned construction, the weight 13 is capable of vibrating in a vertical direction under effects of the springs 16 and the viscous liquid material 23. Further, by changing numbers of additional weights 21, natural frequency of the apparatus 10 is altered so that the natural frequency of the apparatus coincides with a natural frequency of the structure. In the case shown in FIG. 1, the apparatus 10 is installed to the bridge so as to restrain its variation in vertical direction which may be caused by traffics.

Figure 4:
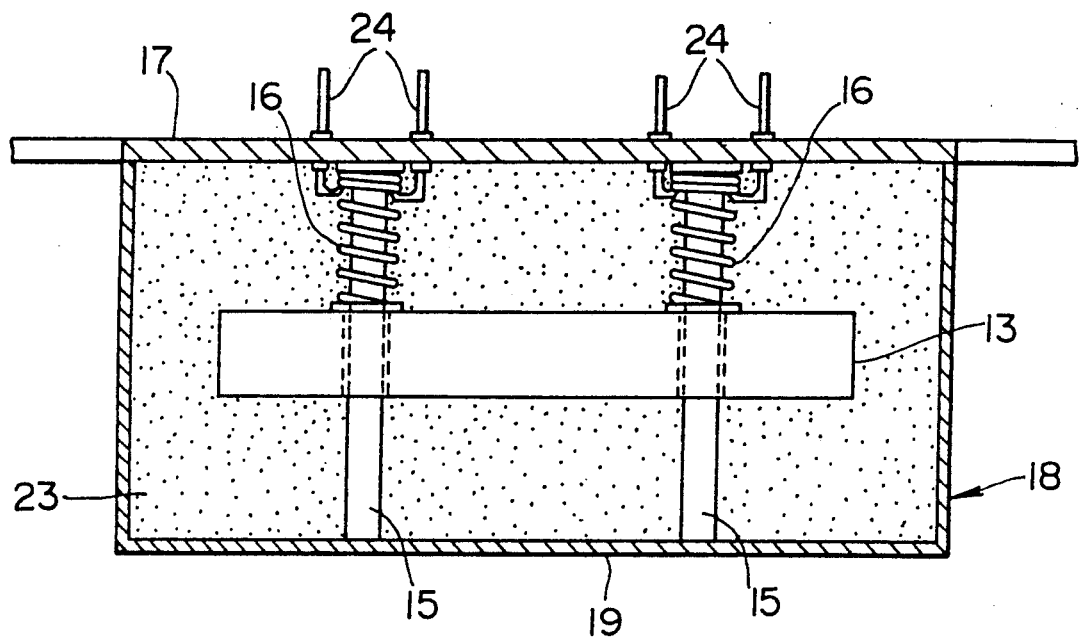
FIG. 4 is a sectional view illustrating an alternative embodiment of a vibration restraining apparatus.
Figure 5:
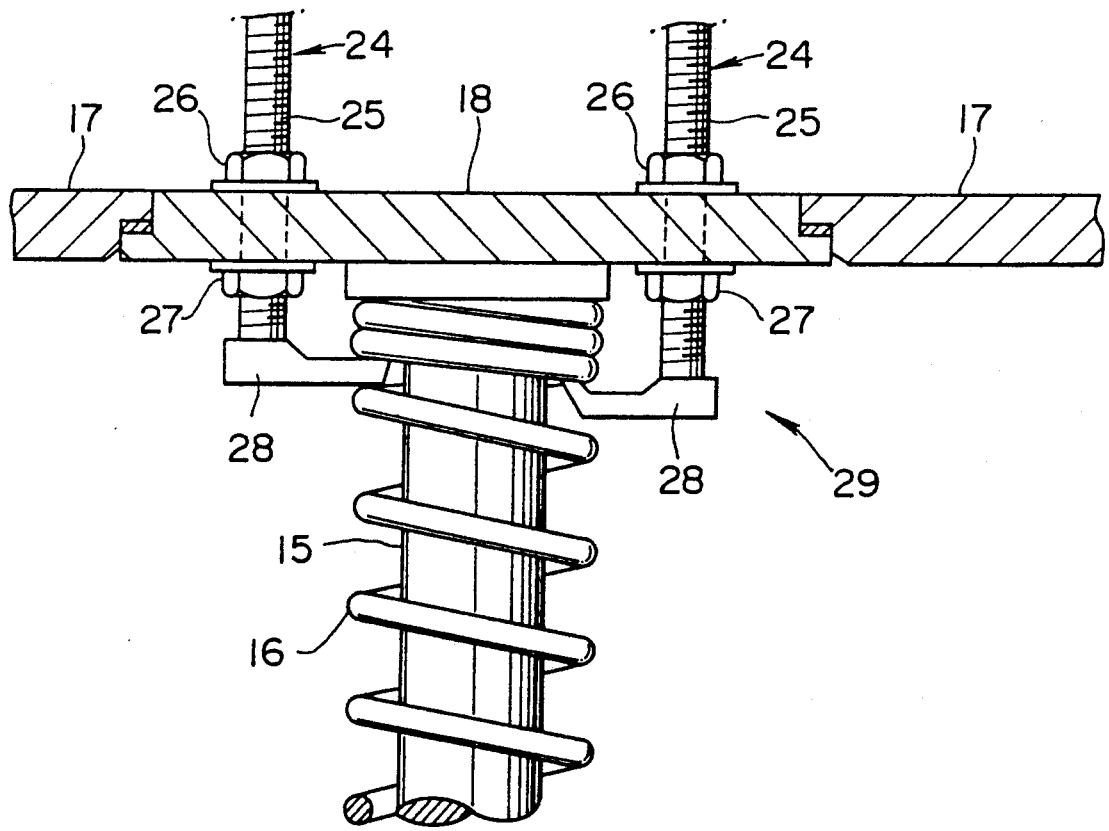
FIG. 5 is a enlarged, sectional view of a portion of the apparatus shown in FIG. 4.

FIGS. 4 and 5 show another embodiment of the vibration restraining apparatus. In the embodiment, the apparatus further comprises (i) a pair of spring holders 29 each of which comprises a pair of bolts 24 having screw threads therearound and passing through a top plate 18 of the spring holder 29, and (ii) a pair of upper and lower nuts 26, 27 for fixation of the bolts 24 with respect to the top plate 18. At a lower end of the bolt 24, there is provided a hooking means 28 projecting perpendicularly from a lower end of the bolt 24. The hooking means 28 comes in contact with the coil spring 16 and restricts displacement of a portion of the spring 16 above the point of contact. Effective length of the springs 16 is adjusted as will be explained as follows by virtue of the spring holders 29.

First, the upper and the lower nuts 26, 27 are released to come apart from the top plate 18 and the hooking means 28 is lowered to a prescribed position. Then, the hooking means 28 is made to engage with a point on the spring 16.

Second, the upper nuts 26 are rotated so that the bolts 24 are raised. As a result, the hooking means 28 pulls up the portion of the spring 16 which is disposed between the hooking means 28 and the top plate 18.

Third, when the parts of the spring 16 come into contact with each other, rotation of the upper nut 26 is then stopped and the lower nut is rotated to secure the position of the bolt 24 at that position.

By the above-mentioned operation, effective length of the springs 16 is thereby increases the natural frequency of the apparatus. By choosing properly the effective length, natural frequency of the apparatus is adjusted to coincide with that of the building. This is a modification of the invention wherein a natural frequency of the vibration restraining apparatus is changed by changing the rigidity of the spring element.

Figure 12:
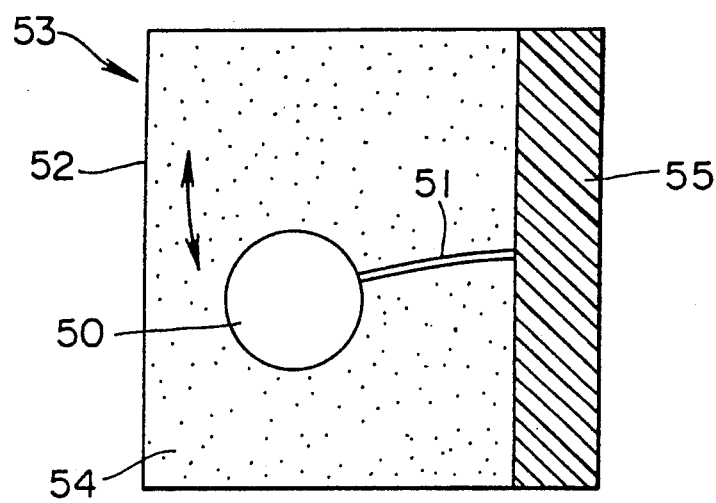
FIG. 12 is a plan view of another embodiment of a vibration restraining apparatus.

FIG. 12 shows a much more simplified embodiment of the invention. The apparatus 53 comprises a weight 50, a spring 51, an enclosure 52, a viscous liquid 54, and a base mat 55.

Figure 8:
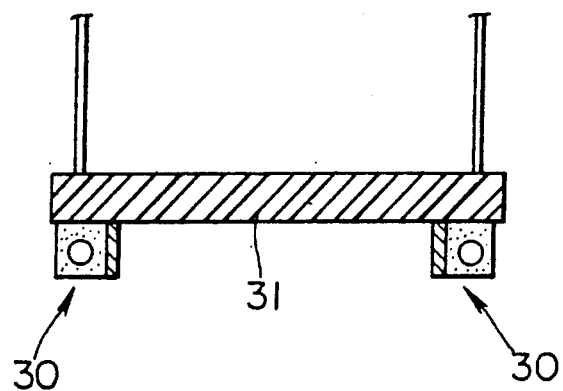
FIG. 8 is an elevation view of another embodiment of a vibration restraining apparatus.
Figure 9:
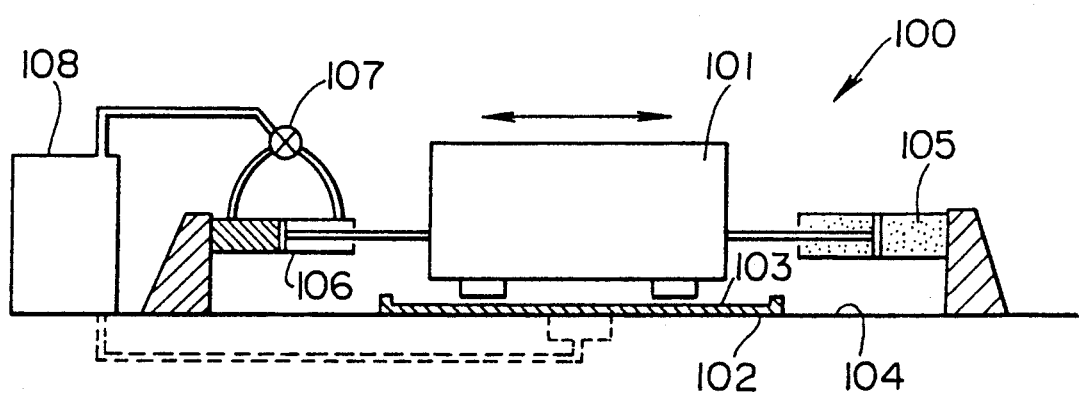
FIG. 9 is a sectional elevation view of a prior art vibration restraining apparatus.

FIG. 8 shows another embodiment of the vibration restraining apparatus. The apparatus comprises a casing 52, a weight 50, a spring member 51 supporting the weight 50 in the casing 52, and a viscous liquid material 54 filling the inner space within the casing 52. By virtue of the restoring force of the spring, the mass can vibrate at its natural frequency. Though the construction is much simpler, the apparatus has effects equivalent to the above-mentioned embodiments in restraining the vibration of the structure.

(3) Third Preferred Embodiment of the Invention

Figure 10:
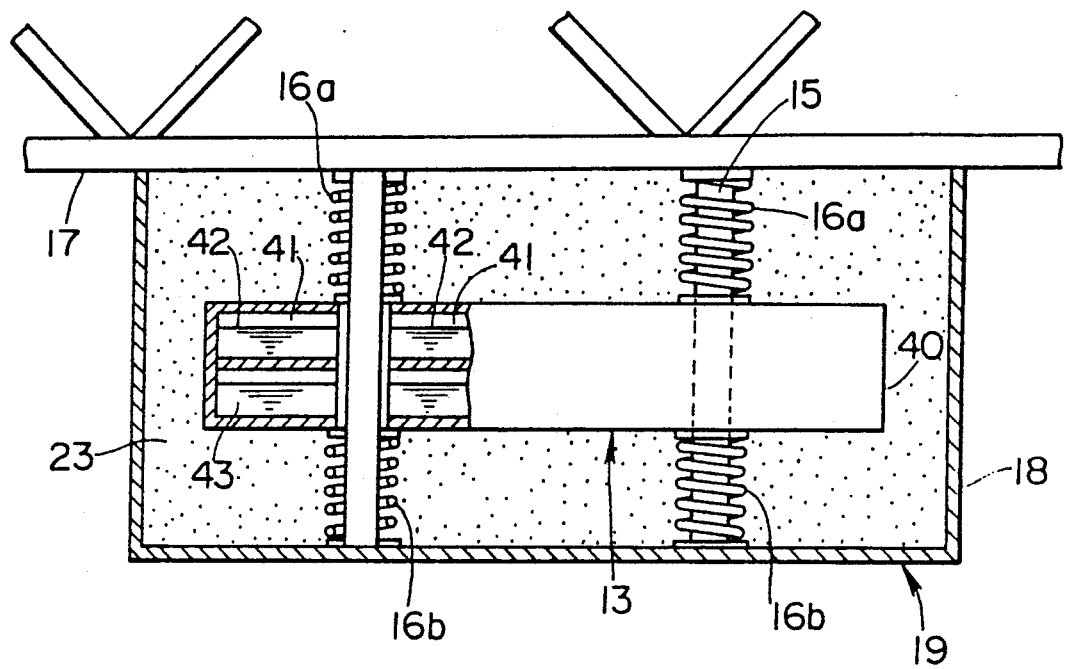
FIG. 10 is a sectional, elevation view of another embodiment of a vibration restraining apparatus.
Figure 11:
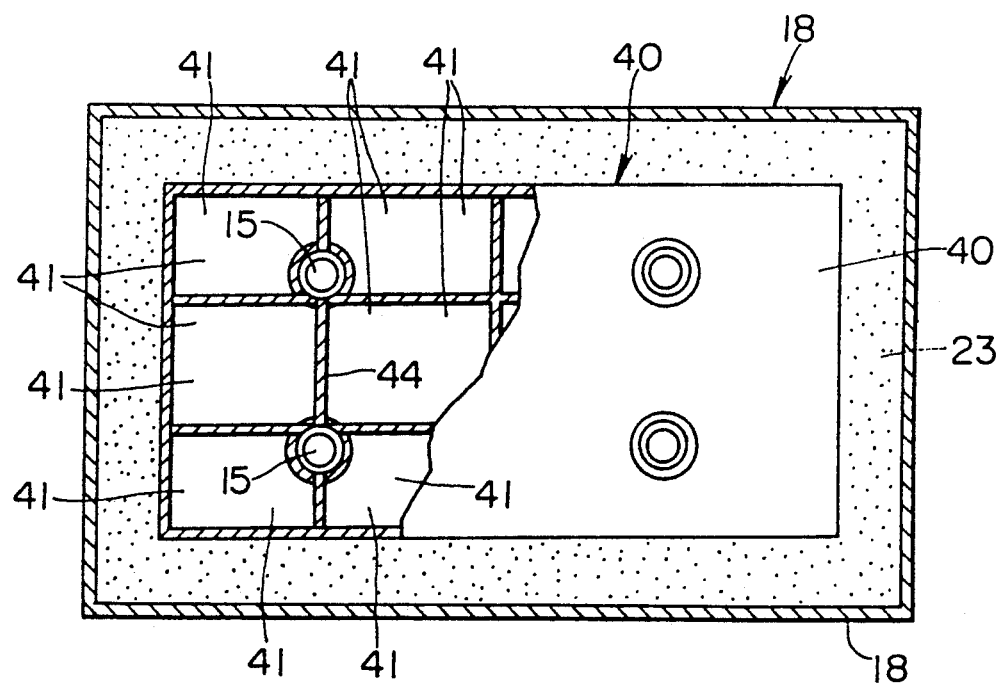
FIG. 11 is a sectional, plan view thereof.

FIGS. 10 and 11 show a further modified embodiment of the invention. Without differences in the weight, the apparatus is similar to that expressed in FIG. 4. In the embodiment, the weight 13 is comprises a shell structure 40 defining an inner space thereby and separation boards 44 separating the inner space into chambers 41. In each chamber, a liquid 43 having a free surface 42 at a top thereof is retained. Geometry of the chambers 41 is identical to each other and so the depth of the liquid 43 retained therein.

In the present invention, the weight 13 has a natural frequency in vertical direction as explained as regards FIG. 4. In the vertical vibration, effective mass is a summation of the mass of the shell 40 and the mass of the viscous liquid 43. In horizontal directions, the liquid 43 vibrates due to its sloshing.

Natural frequencies of sloshing Fs are determined as follows.

$$Fs = ks \, g \, \tan h \, (ks \, h)/2 \, pi$$

where
$ks = (2n-1) \, pi/2a$,
n = order of the mode concerned,
pi = ratio of a circumference to its diameter,
2a = width of the chamber in the direction of oscillation,
g = gravity, and
h = depth of the water Therefore, in horizontal directions, the apparatus acts as an apparatus for restraining vibration by virtue of the sloshing of the liquid 43. By selecting properly the geometry of the chambers, amount of the liquid to be retained therein and properties of the liquid, it is possible to make the natural frequency of sloshing to coincide with that of the structure. Here also, the effective mass of the apparatus hereof has to be in the order of a few percent of the effective mass of the structure.

As is explained hereinbefore, the present invention provides a method for restraining vibration of a structure therefor which has a relatively simple construction and costs less.

There is also provided an apparatus for restraining vibration of a structure which is effective in suppressing three dimensional vibrations.

Another object of the invention is to provide a method and apparatus for restraining vibration of a structure effectively.

What is claimed is:

1. An apparatus for restraining vibration of a structure, having at least one natural mode of vibration, the apparatus comprising:
   (a) an enclosure defining an inner space therein;
   (b) a main weight having mass and being enclosed in the enclosure, said enclosure further comprising a guide means for permitting a movement of the main weight exclusively in a vertical direction, and said main weight being in a closed form defining a chamber therein, and liquid having a free surface being retained in the chamber, whereby the main weight is able to vibrate at a vertical natural frequency in a vertical direction and the liquid is capable of sloshing at a horizontal natural frequency in response to a horizontal movement of the main weight together with said enclosure;
   (c) a resilient member connecting the weight to the enclosure and exerting on the weight, a restoring force proportional to the relative displacement of the weight with respect to the enclosure;
   (d) viscous liquid retained in said inner space, said liquid having a viscosity which provides to the weight, a damping force proportional to a relative velocity of the weight with respect to the enclosure, said resilience of said resilient member and said mass of said main weight providing said apparatus with at least one natural frequency of vibration; and
   (e) adjustment means for adjusting said resilience of said resilient member and/or the mass of said weight, so as to be capable of adjusting said natural frequency of said apparatus to correspond to at least one said natural mode of vibration in said structure so as to restrain vibration in said structure, whereby said natural frequency of said apparatus is capable of being changed as said natural mode of vibration as said structure changes naturally and gradually over time.

2. The apparatus for restraining vibration of a structure according to claim 1, wherein the enclosure comprises an upper plate and a lower plate defining an upper end and a lower end of the inner space respectively, the guide means comprises at least one guide rod connecting the upper plate and the lower plate, and the main weight is engaged with the guide rod for sliding movement in a vertical direction.

3. In combination, a building structure and apparatus for restraining vibration of said building structure, said building structure having at least one natural mode of vibration, and said apparatus comprising;
   (a) an enclosure defining an inner space therein and capable of being mounted to said building structure;
   (b) a main weight enclosed in the enclosure;
   (c) a resilient member connecting the weight to the enclosure and exerting on the weight, a restoring force proportional to the relative displacement of the weight with respect to the enclosure;
   (d) viscous liquid retained in said inner space, said liquid having a viscosity which provides to the weight, a damping force proportional to a relative velocity of the weight with respect to the enclosure, the resilience of said resilient member and the mass of said main weight providing said apparatus with at least one natural frequency of vibration; and
   (e) adjustment means for adjusting the mass of said weight, so as to be capable of adjusting said natural frequency of said apparatus to correspond to at least one said natural mode of vibration in said structure so as to restrain vibration in said building structure, said adjustment means including mass adjustment means for altering at least one natural frequency of the apparatus to correspond to at least one natural mode of vibration of said building structure, said mass adjustment means comprising a plurality of individual weight members connected together which comprise said main weight, said individual weight members being detachable from each other whereby the mass of said main weight is adjustable by changing the number of said individual weight members thereof.

4. In combination, a building structure and apparatus for restraining vibration of the building structure, the apparatus comprising:

an enclosure defining an inner space therein;

a main weight enclosed in the enclosure, said enclosure further comprising a guide means for permitting a movement of the main weight exclusively in a vertical direction, and said main weight being in a closed form defining a chamber therein, and liquid having a free surface being retained in the chamber, whereby the main weight is able to vibrate at a vertical natural frequency in a vertical direction and the liquid is capable of sloshing at a horizontal natural frequency in response to a horizontal movement of the main weight together with said enclosure;

a resilient member connecting the weight to the enclosure and exerting on the weight, a restoring force proportional to the relative displacement of the weight with respect to the enclosure;

viscous liquid retained in said inner space, said liquid having a viscosity which provides to the weight, a damping force proportional to a relative velocity of the weight with respect to the enclosure, said resilience of said resilient member and the mass of said main weight providing said apparatus with at least one natural frequency of vibration; and adjustment means for adjusting said resilience of said resilient member and/or the mass of said weight, so as to be capable of adjusting the natural frequency of said apparatus to correspond to at least one said natural mode of vibration in said structure so as to restrain vibration in said structure, whereby the natural frequency of said apparatus is capable of being changed as the natural mode of vibration of said structure changes naturally and gradually over time, at least one natural frequency of the apparatus corresponding to a vertical movement of the main weight generally coinciding with at least one natural frequency of the structure in a vertical direction, and at least one natural frequency of the apparatus corresponding to the sloshing of the viscous liquid generally coinciding with at least one natural frequency of the structure in the horizontal direction.

* * * * *